US009060088B2

(12) United States Patent
Yamamoto

(10) Patent No.: US 9,060,088 B2
(45) Date of Patent: Jun. 16, 2015

(54) IMAGE PROCESSING APPARATUS WITH POWER SUPPLY/STOP CONTROL

(71) Applicant: Hiroyuki Yamamoto, Kasugai (JP)

(72) Inventor: Hiroyuki Yamamoto, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 86 days.

(21) Appl. No.: 13/767,236

(22) Filed: Feb. 14, 2013

(65) Prior Publication Data

US 2013/0301074 A1 Nov. 14, 2013

(30) Foreign Application Priority Data

May 14, 2012 (JP) ................................ 2012-110674

(51) Int. Cl.
*G06K 15/00* (2006.01)
*H04N 1/00* (2006.01)

(52) U.S. Cl.
CPC ....... *H04N 1/00891* (2013.01); *H04N 1/00925* (2013.01); *H04N 2201/0094* (2013.01)

(58) Field of Classification Search
CPC ................ H04N 1/00925; H04N 2201/0094; B41J 11/006; B41J 3/46; G06F 1/3287; G06F 1/26; G06F 1/263; G06F 1/3203; G06F 1/3206; G06F 1/3228; G06F 1/3234; Y02B 60/1278; Y02B 60/1282
USPC .......................... 358/1.14, 448; 713/300, 320
See application file for complete search history.

(56) References Cited

U.S. PATENT DOCUMENTS

| 2005/0216776 | A1* | 9/2005 | Watanabe ..................... 713/300 |
| 2005/0248807 | A1* | 11/2005 | Kuroyanagi ................. 358/1.15 |
| 2008/0038005 | A1* | 2/2008 | Mizude et al. .................. 399/49 |
| 2010/0046025 | A1 | 2/2010 | Torii | |
| 2011/0199630 | A1* | 8/2011 | Oozawa ....................... 358/1.14 |

FOREIGN PATENT DOCUMENTS

| JP | 5-246118 | 9/1993 |
| JP | 11-190962 | 7/1999 |
| JP | 2005-134812 | 5/2005 |
| JP | 2009-279889 | 12/2009 |
| JP | 2010-46967 | 3/2010 |
| JP | 2011-107419 | 6/2011 |

OTHER PUBLICATIONS

English Machine Translation of JP 2005-134812-A (Irie, Published May 26, 2005).*

* cited by examiner

*Primary Examiner* — Benny Q Tieu
*Assistant Examiner* — Juan M Guillermety
(74) *Attorney, Agent, or Firm* — Scully, Scott, Murphy & Presser, PC

(57) ABSTRACT

There is provided an image processing apparatus including an image processing section, a power source section, a power source operation section, and a controller. The controller may be configured to perform determining whether or not a state of the image processing apparatus is a special state when a power control operation is started, determining whether or not the power control operation is the special power control operation, and controlling the power source section to carry out an operation according to the power control operation when the state is not the special state, or when the state is the special state and when the power control operation is the special power control operation, but controlling the power source section not to carry out the operation when the state is the special state and when the power control operation is not the special power control operation.

6 Claims, 6 Drawing Sheets

IMAGE PROCESSING APPARATUS WITH POWER SUPPLY/STOP CONTROL

CROSS REFERENCE TO RELATED APPLICATION

The present application claims priority from Japanese Patent Application No. 2012-110674 filed on May 14, 2012, the disclosure of which is incorporated herein by reference in its entirety.

BACKGROUND OF THE INVENTION

1. Field of the Invention

The present invention relates to a technique of switching electric power supply/stop to an image processing section.

2. Description of the Related Art

Conventionally, there are known printing devices which do not turn off the power when its power switch is turned off with some unprinted data being stored in the page-image buffer.

SUMMARY OF THE INVENTION

However, even in cases where it is undesirable to turn off the power because the unprinted data will vanish, etc., when the power is turned off, a user may still desire to turn off the power to a printing device with knowledge of such cases. Conventionally, such cases have not been taken into consideration.

The present description discloses a technique which enables a user to switch electric power supply/stop when the user desires to switch the electric power supply/stop with knowledge of a special state while restricting the user from switching the electric power supply/stop without being aware of the fact that the state of an image processing apparatus is the special state such that it is undesirable to switch the electric power supply/stop to the image processing section through a general power control operation.

According to an aspect of the present invention, there is provided an image processing apparatus including an image processing section, a power source section, a power source operation section, and a controller. The power source section is configured to supply electric power to the image processing section. The power source operation section configured to receive power control operation which includes a general power control operation and a special power control operation different from the general power control operation. The controller configured to perform determining whether or not the state of the image processing apparatus is a special state where the switching of the electric power supply/stop to the image processing section according to the general power control operation is restricted, under a condition that the power control operation is started, determining whether or not the power control operation received by the power source operation section is the special power control operation, controlling the power source section to carry out an operation including at least one of supplying the electric power to the image processing section and stopping the electric power supply according to the power control operation received by the power source operation section, under a condition that the state of the image processing apparatus is determined to be not the special state, or under a condition that the state of the image processing apparatus is determined to be the special state and that the power control operation is determined to be the special power control operation and controlling the power source section not to carry out the operation, under a condition that the state of the image processing apparatus is determined to be the special state and that the power control operation is determined to be not the special power control operation.

DESCRIPTION OF THE PREFERRED EMBODIMENTS

First Embodiment

Based on FIGS. 1 to 5, a first embodiment of the present teaching will be explained.

(1) Electrical Configuration of a Multifunction Printer

Figure 1:
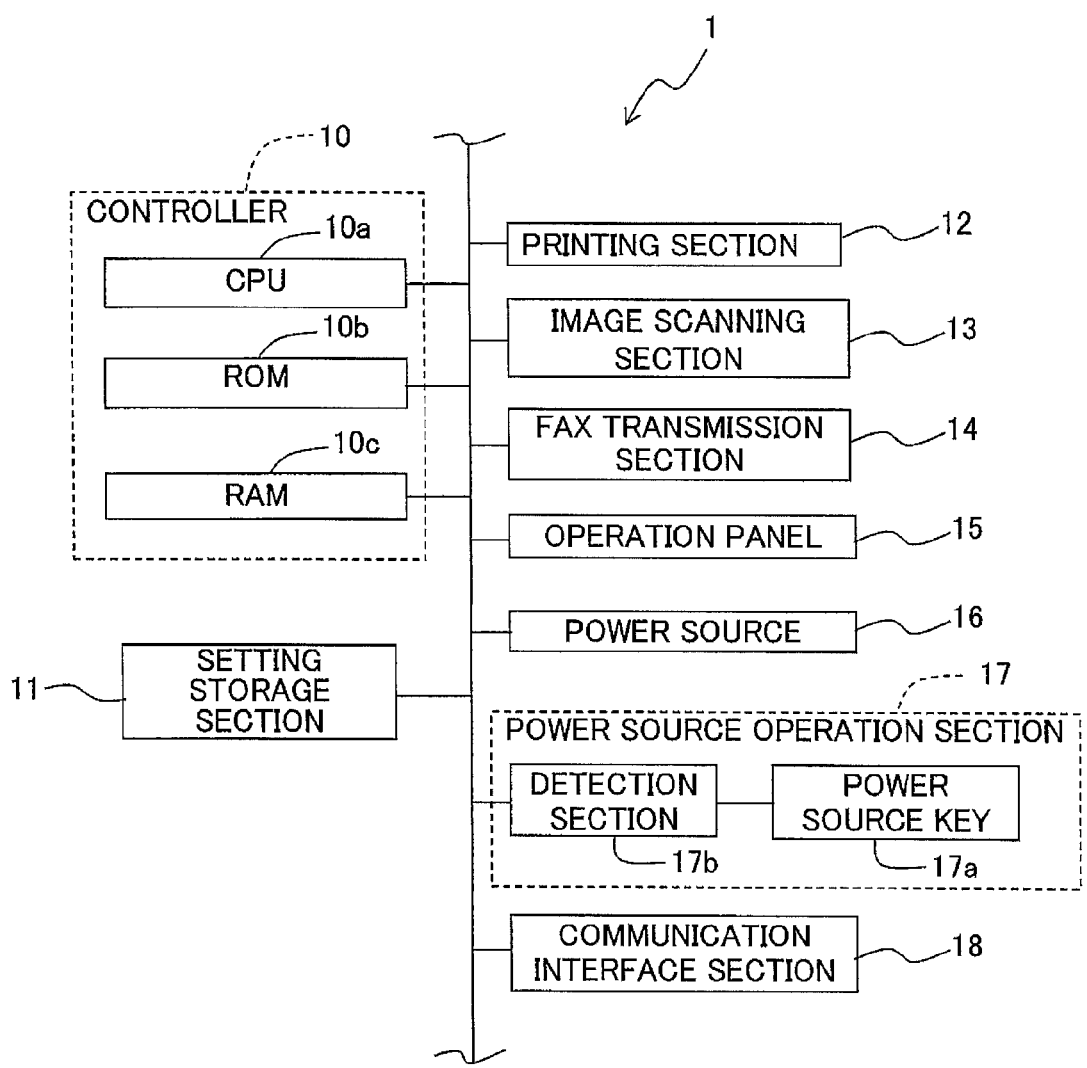
FIG. 1 is a block diagram of a multifunction printer in accordance with a first embodiment of the present teaching.

First, referring to FIG. 1, an explanation will be given about an electrical configuration of an image processing apparatus in accordance with the first embodiment. The image processing apparatus in accordance with the first embodiment is a so-called multifunction printer which has a PC print function, a scan function, a photocopy function, a facsimile transmission (sending and receiving facsimile) function, an email print function, an email notification function, etc. In the following explanations, the term "facsimile" will be abbreviated as "FAX".

The multifunction printer 1 includes a control section 10, a setting storage section 11, a printing section 12, an image scanning section 13, a FAX transmission section 14, an operation panel 15, a power source section 16, a power source operation section 17, a communication interface section 18, etc.

The control section 10 includes a CPU 10a, a ROM 10b, and a RAM 10c. The CPU 10a controls each section of the multifunction printer 1 by executing programs stored in the ROM 10b. Further, the CPU 10a also functions as a software clock by executing a predetermined program. The ROM 10b stores the programs, data and the like for the CPU 10a to execute and process. The RAM 10c is used as a main storage device for the CPU 10a to carry out various processes. The RAM 10c is an example of a volatile memory.

The setting storage section 11 is constructed by using a nonvolatile memory such as a flash memory, hard disk and the like to store various setting values. The setting storage section 11 is an example of the nonvolatile memory.

The printing section 12 includes a sheet tray containing sheets of printing paper and the like, a transport section transporting one by one the sheets contained in the sheet tray and an image formation section forming an image on the sheet being transported by the transport section by an electrophotographic method or an ink jet method, etc.

Further, the printing section 12 includes a plurality of jam sensors arranged apart from each other along a transport path of the sheets. Each of the jam sensors detects whether or not there is any sheet within the detection range of the jam sensor, and outputs the detection result to the control section 10. The control section 10 determines whether or not a jam is occurring by acquiring the detection result from each of the jam sensors.

The image scanning section 13 includes a manuscript tray loading manuscripts, a transport section transporting one by one the manuscripts loaded in the manuscript tray, an image sensor, etc., to generate an image data by scanning the manuscript transported by the transport section. The image scanning section 13 also includes jam sensors.

The FAX transmission section 14 carries out FAX transmission of image data via telephone lines to and from external FAX devices.

Each of the printing section 12, the image scanning section 13, and the FAX transmission section 14 is an example of an image processing section.

The operation panel 15 includes a plurality of manual operation buttons, and a display device such as a liquid crystal display or the like, to take in or receive various operations from a user.

The power source section 16 is, for example, a switching power source to supply electric power to each section of the multifunction printer 1.

Here, turning on the power to the multifunction printer 1 refers to supplying the electric power from the power source section 16 to every section of the multifunction printer 1 except the control section 10 (at least to any of the image processing sections). The reason for "except the control section 10" is because when a power key 17a is pressed down in a power-off state, then the electric power is first supplied to the control section 10, and the control section 10 supplied with the electric power then controls the power source section 16 to supply the electric power to the every section. That is, the every section mentioned here excludes the control section 10 to which the electric power supply has already begun.

Further, turning off the power to the multifunction printer 1 refers to stopping the electric power supply from the power source section 16 to every section except a detection section 17b (at least to any of the image processing sections). Further, when turning off the power, it is supposed here to also stop the electric power supply to the control section 10.

Further, although the explanation made here has taken an example of stopping the electric power supply to every section except the detection section 17b when turning off the power, this is only an example and, if necessary, the electric power may also be supplied to other sections than the detection section 17b when turning off the power.

The power source operation section 17 includes the power key 17a and the detection section 17b.

The power key 17a is a switch to receive user's power control operation of turning on/off the power to the multifunction printer 1. The power key 17a receives a general power control operation, and a special power control operation different from the general power control operation, both of which will be explained next.

The general power control operation is such an operation that the power key 17a is pressed continuously for, say, less than two seconds. That is, the general power control operation is a so-called "short press". For example, the operating manual of the multifunction printer 1 describes that the power is turned on/off through the general power control operation, and the user turns on/off the power usually through the general power control operation.

The special power control operation is such an operation that the power key 17a is pressed continuously for, say, not less than two seconds. That is, the special power control operation is a so-called "long press". Because the special power control operation takes a longer time to press down the power key 17a than the general power control operation, it is a more complicated operation than the general power control operation.

The detection section 17b is connected electrically with the power key 17a to detect the power control operations by the power key 17a. In particular, the detection section 17b monitors the power key 17a and, when the power key 17a is pressed down, then it notifies the CPU 10a that a power control operation has begun. Further, the detection section 17b has a timekeeping function to determine whether the general power control operation or the special power control operation is carried out by measuring the time from pressing down the power key 17a to releasing the same, and notifies the CPU 10a which power control operation has been carried out.

Here, when the power to the multifunction printer 1 is off, no electric power is supplied to the CPU 10a. Therefore, when the power key 17a is pressed down when the power to the multifunction printer 1 is off, then the detection section 17b first controls the power source section 16 to supply the electric power to the CPU 10a. Next, after the CPU 10a is actuated, the detection section 17b notifies the CPU 10a that a power control operation has begun, and which power control operation has been carried out.

The communication interface section 18 is an interface for communications with external devices such as personal computers (PC) and the like. The communication interface section 18 may either communicate with external devices via a communication network such as a LAN (Local Area Network), the Internet or the like, or communicate with external devices via a USB (Universal Serial Bus) cable or a parallel port cable. Further, the communication interface section 18 may also communicate with external devices by way of either wire communication or wireless communication.

(2) Functions of the Multifunction Printer

Among the functions included in the multifunction printer 1, explanations will be given below about the PC print function, FAX transmission function, email print function, and email notification function.

(a) PC Print Function

The PC print function serves to receive a print job from a PC, and print the image on a sheet based on the received print job. The print job received through the PC print function is stored in the RAM 10c as a print job waiting for printing. The print job waiting for printing is printed as soon as the printer becomes ready to print that print job.

It is also possible to carry out a secure print through the PC print function. A secure print flow will be explained below.

When the user issues a secure print instruction, then the PC sets authentication information to the print job and sends same to the multifunction printer 1. In the following explanation, a secure print job refers to a print job to which the authentication information has been set. When receiving a secure print job from the PC, the multifunction printer 1 does not execute the secure print job immediately, but stores it into the RAM 10c as a secure print job waiting for authentication.

Then, on receiving the fact that the user has inputted the authentication information by operating the operation panel 15 of the multifunction printer 1, the multifunction printer 1 changes the secure print job into a print job waiting for printing with the authentication information set in consistency with the authentication information inputted by the user operating the operation panel 15 among the secure print jobs waiting for authentication. By doing so, it is possible not to let others see the printing result before the user, who issued the print instruction on the PC, goes to the multifunction printer 1 to take the printing result.

(b) FAX Transmission Function

The FAX transmission function serves to let the image scanning section 13 scan a manuscript to generate an image data and let the FAX transmission section 14 FAX-send the generated image data to an external FAX device, and serves to let the FAX transmission section 14 FAX-receive an image data denoting an image from an external FAX device and let the printing section 12 print the image on a sheet.

When FAX-sending an image data, the generated image data is stored in the RAM 10c as an image data which is waiting to be FAX-sent until the connection to the destination FAX device is established.

When having FAX-received an image data, the multifunction printer 1 generates a print job from the received image data, and stores the same into the RAM 10c as a print job waiting for printing.

(c) Email Print Function

The email print function serves to let the multifunction printer 1 print an image data attached to an email received by the multifunction printer 1 from an external PC which has sent the email with the attached image data to the multifunction printer 1. When having received an image data by email, the multifunction printer 1 generates a print job from the received image data, and stores the same into the RAM 10c as a print job waiting for printing.

(d) Email Notification Function

The email notification function serves to notify an administrator of a current state of the multifunction printer 1 by email. The information indicating the current state of the multifunction printer 1 is stored in the RAM 10c, and sent to the administrator with a predetermined timing such as once a day or the like.

(3) Special State

Next, with respect to a special state in which it is undesirable to switch the electric power supply/stop to the image processing section through the general power control operation, explanations will be given separately for the case of switching from stop to supply and for the case of switching from supply to stop. Further, it is possible to rephrase the special state as a state which restricts switching the electric power supply/stop to the image processing section according to the general power control operation.

Here, the case of switching from stop to supply refers to, namely, the case of turning on the power to the multifunction printer 1. The case of switching from supply to stop refers to, namely, the case of turning off the power to the multifunction printer 1.

(3-1) The Case of Switching from Stop to Supply (Turning On the Power)

An example of the special state when turning on the power will be explained below.

(a) A State in Which no Electric Power has ever been Supplied Since Factory Shipment In order to protect the image processing section from bump in transportation, the image processing section is protected by a protective sheet at the time of factory shipment. For example, when the printing section 12 is adapted to print images on sheets by an electrophotographic method, then in order to prevent the photoreceptor drum from contact with other components to suffer damage due to bump in transportation, the protective sheet is arranged between the photoreceptor drum and other components.

In this case, when printing is carried out without removing the protective sheet, then it is liable to wind the protective sheet into some moving part inside the multifunction printer 1. Therefore, when the protective sheet is arranged, then it is desirable for the user to remove the protective sheet before turning on the power to the multifunction printer 1 for the first time after factory shipment.

However, it is also possible for the user to turn on the power without being aware of that. Therefore, because it is still possible that the protective sheet is not removed, this state, in which no electric power has ever been supplied to the image processing section since factory shipment, can be said to be a state in which it is undesirable to supply the electric power to the image processing section through the general power control operation.

However, because it is also possible that the user has removed the protective sheet, it is undesirable to completely forbid turning on the power.

The setting storage section 11 stores a shipment flag indicating whether or not electric power has ever been supplied since factory shipment. At the time of factory shipment, the value "ON" is set in the shipment flag to indicate no electric power has ever been supplied. By referring to the shipment flag, the CPU 10a determines whether or not electric power has ever been supplied since factory shipment. The shipment flag is an example of electric power supply information.

(b) A State in Which the Power is Turned Off with Some Jam Left Unsolved

When a sheet jam has occurred, it is also possible to turn off the power to the multifunction printer 1 with the jam left unsolved. In this case, the user may or may not carry out an operation of solving the jam during the time of power-off.

When the jam is not solved during the time of power-off, then the jam is liable to get serious in case the power to multifunction printer 1 is turned on to carry out printing. Therefore, this state, in which the power to the multifunction printer 1 is turned off with some jam left unsolved, can be said to be a state in which it is undesirable to supply the electric power to the image processing section through the general power control operation.

However, because it is also possible that the user carries out the operation of solving the jam during the time of power-off, it is undesirable to completely forbid turning on the power.

Here, the CPU 10a is supposed to let the setting storage section 11 store some information indicating that a jam, if any, is occurring. Then, by referring to this information, the CPU 10a determines whether or not the power is turned off with the jam left unsolved.

(c) A State in Which the Elapsed Time Since Stopping the Electric Power Supply to the Image Processing Section is Within a Reference Time Immediately after stopping the electric power supply, some false signal may be inputted to the CPU 10a due to chattering. The term "chattering" refers to such a phenomenon that an electrical signal is repetitively off and on due to the shaking at a turn of a contact switch. Because it is not possible to distinguish whether the electrical signal inputted from the power key 17a to the detection section 17b is a false signal inputted due to the chattering or a signal inputted by pressing down the power key 17a, this state, in which the elapsed time since stopping the electric power supply to the image processing section is within the reference time, can be said to be a state in which it is undesirable to supply the electric power to the image processing section through the general power control operation.

However, because it is also possible that the user still desires to use the multifunction printer 1 even though the elapsed time is within the reference time, it is undesirable to completely forbid turning on the power.

Further, it is possible to appropriately determine the above reference time through experiments and the like.

(3-2) The Case of Switching from Supply to Stop (Turning Off the Power)

An example of the special state when turning off the power will be explained below.

(a) A State in Which Some Jam is Left Unsolved

When some jam has occurred, a particular process may be carried out after the jam is solved. When no jam is occurring when the power to the multifunction printer 1 is first turned off and then turned on, then it is difficult to correctly determine whether or not the above particular process should be carried out without knowing whether some jam was solved during the time of power-off or no jam occurred at all during the time of power-off. Therefore, when some jam has occurred, then it is desirable to solve the jam before turning off the power to the multifunction printer 1.

That is, this state, in which some jam is left unsolved, can be said to be a state in which it is undesirable to stop the electric power supply to the image processing section through the general power control operation. The state in which some jam is left unsolved is an example of a state in which some abnormity is occurring in the image processing section.

However, because it is also possible that the user desires to turn off the power to the multifunction printer 1 with knowledge of the unsolved jam, it is undesirable to completely forbid turning off the power.

(b) A State in Which the RAM 10*c* has Stored Some Data Which Bring a Great Influence when Vanishing The data stored in the RAM 10*c* include the aforementioned print jobs waiting for printing, secure print jobs waiting for authentication, secure print jobs waiting for printing, image data waiting for FAX-sending, information indicating the state of the multifunction printer 1, etc.

Among these data, some bring a small influence even when they vanish from the RAM 10*c* when turning off the power to the multifunction printer 1, whereas some bring a great influence when they vanish from the RAM 10*c*.

For example, it can be said that a small influence is brought by the vanishing of an ordinary print job received through the PC print function because the user can resend the print job from the PC. It can be said that an image data waiting for FAX-sending also brings a small influence because it is possible to re-scan the manuscript. It can be said that the information indicating the state of the multifunction printer 1 also brings a small influence when vanishing.

In contrast to this, it can be said that a great influence is brought by the vanishing of a print job generated on the basis of a FAX-received image data because a request has to be made to the sender for retransmission. Further, because a secure print job is liable to illicit obtainment on communication networks to leak secret information, repetitive transmission is undesirable. Therefore, it can be said that a secure print job also brings a great influence.

Here, the data which bring a great influence when vanishing are classified as first-type data, while the data which bring a small influence when vanishing are classified as second-type data. The state in which the first-type data are stored in the RAM 10*c* is a state in which it is undesirable to stop the electric power supply to the image processing section through the general power control operation.

However, because it is also possible that the user desires to turn off the power to the multifunction printer 1 with knowledge of the fact that the first-type data are stored in the RAM 10*c*, it is undesirable to completely forbid turning off the power.

Further, depending on some sender, a small influence may also be brought by the vanishing of a print job generated on the basis of a FAX-received image data. Therefore, by beforehand associating the telephone number of a FAX sender with an influential degree in case of the vanishing of a FAX-received image data from that sender, it is possible to individually determine whether or not it belongs to the first-type data based on the influential degree.

Further, the reference for classifying data as the first-type data or as the second-type data is not limited to the influential degree in case the data vanish. For example, a data may also be classified according to its important degree. In particular for example, when the PC print function is used, it is also possible to determine whether or not a data belongs to the first-type data by determining its important degree from the user ID added to the print job. It is possible to appropriately set the reference for classifying the data as the first-type data or as the second-type data. It may either be set by the user or be preset as default to the multifunction printer 1.

Further, although the explanation made here takes an example of storing the above data into the RAM 10*c* which is a volatile memory, depending on some model of the multifunction printer 1, it is also possible to store the above data into a nonvolatile memory such as a flash memory, hard disk, or the like. When the multifunction printer 1 belongs to such a model that the above data are stored into a nonvolatile memory, then the data do not vanish even when the power is turned off with the data being stored. Therefore, even when the first-type data are stored, it is not the special state.

(4) Power-On Process and Power-Off Process by the CPU

When a power control operation has begun, the CPU 10*a* determines whether or not the state of the multifunction printer 1 is the special state. When it is not the special state, then the CPU 10*a* controls the power source section 16 to carry out either the operation of supplying the electric power to the image processing section or the operation of stopping the electric power supply.

On the other hand, when it is the special state, then the CPU 10*a* determines whether or not the power control operation received by the power key 17*a* is the special power control operation. When it is the special power control operation, then the CPU 10*a* causes the power source section 16 to carry out the above operation, whereas when it is not the special power control operation, i.e., it is the general power control operation, then the CPU 10*a* does not cause the power source section 16 to carry out the above operation.

When the state of the multifunction printer 1 is the special state, then even though the general power control operation is received, the power source section 16 is not caused to carry out the above operation. This is because the user may possibly be attempting to turn on/off the power without being aware of the special state.

On the other hand, even though the state of the multifunction printer 1 is the special state, when the special power control operation is received, then the power source section 16 is still caused to carry out the above operation. This is because it is possible to presume that the user is attempting to turn on/off the power with being aware of the special state from the fact that the user is deliberately carrying out the special power control operation which is different from the general power control operation.

An explanation will be given below about a process by the CPU 10*a* when a power control operation is detected. The process is divided into a power-on process and a power-off process.

(4-1) Power-On Process

First, referring to FIG. 2, the power-on process will be explained. This process is started as the detection section 17*b* notifies the CPU 10*a* that a power control operation has begun, after the detection section 17*b* detects the power control operation when turning on the power to the multifunction printer 1, and thereby the detection section 17b controls the power source section 16 to supply the electric power to the CPU 10a to actuate the same.

In step S101, the CPU 10a carries out a "state determination process when turning on the power" to determine whether or not the state of the multifunction printer 1 is the special state.

In the "state determination process when turning on the power", which will be described in detail hereinafter, when the state is the special state, then "ON" is set to a special state flag which indicates whether or not it is the special state.

In step S102, the CPU 10a refers to the above special state flag to determine whether or not it is the special state and, when so, then the CPU 10a proceeds to step S103, whereas when not, then the CPU 10a proceeds to step S104.

In step S103, the CPU 10a determines whether or not the power control operation, of which the detection section 17b has notified the CPU 10a, is the special power control operation (long press). However, at the point of step S103, it is possible that the user is still in the middle of carrying out the power control operation, and the detection section 17b has not yet issued the notification of the power control operation. In such case, it is supposed to wait to make the determination until the detection section 17b issues the notification of the power control operation from. Step S103 is an example of a special operation determination process.

When the power control operation of which the detection section 17b has notified the CPU 10a is the special power control operation, then the CPU 10a proceeds to step S104, whereas when it is not the special power control operation, i.e., it is the general power control operation, then this process is ended.

In step S104, the CPU 10a controls the power source section 16 to carry out the operation of supplying the electric power to every section of the multifunction printer 1. By virtue of this, the power to the multifunction printer 1 is turned on. Step S104 is an example of a power control process.

Here in the first embodiment, when it is determined to be not the special state in step S102, then the process proceeds to step S104 without determining whether the power control operation of which the detection section 17b has notified the CPU 10a is the general power control operation or the special power control operation. Therefore, when it is not the special state, then the power is turned on whether the general power control operation or the special power control operation is carried out.

Figure 3:
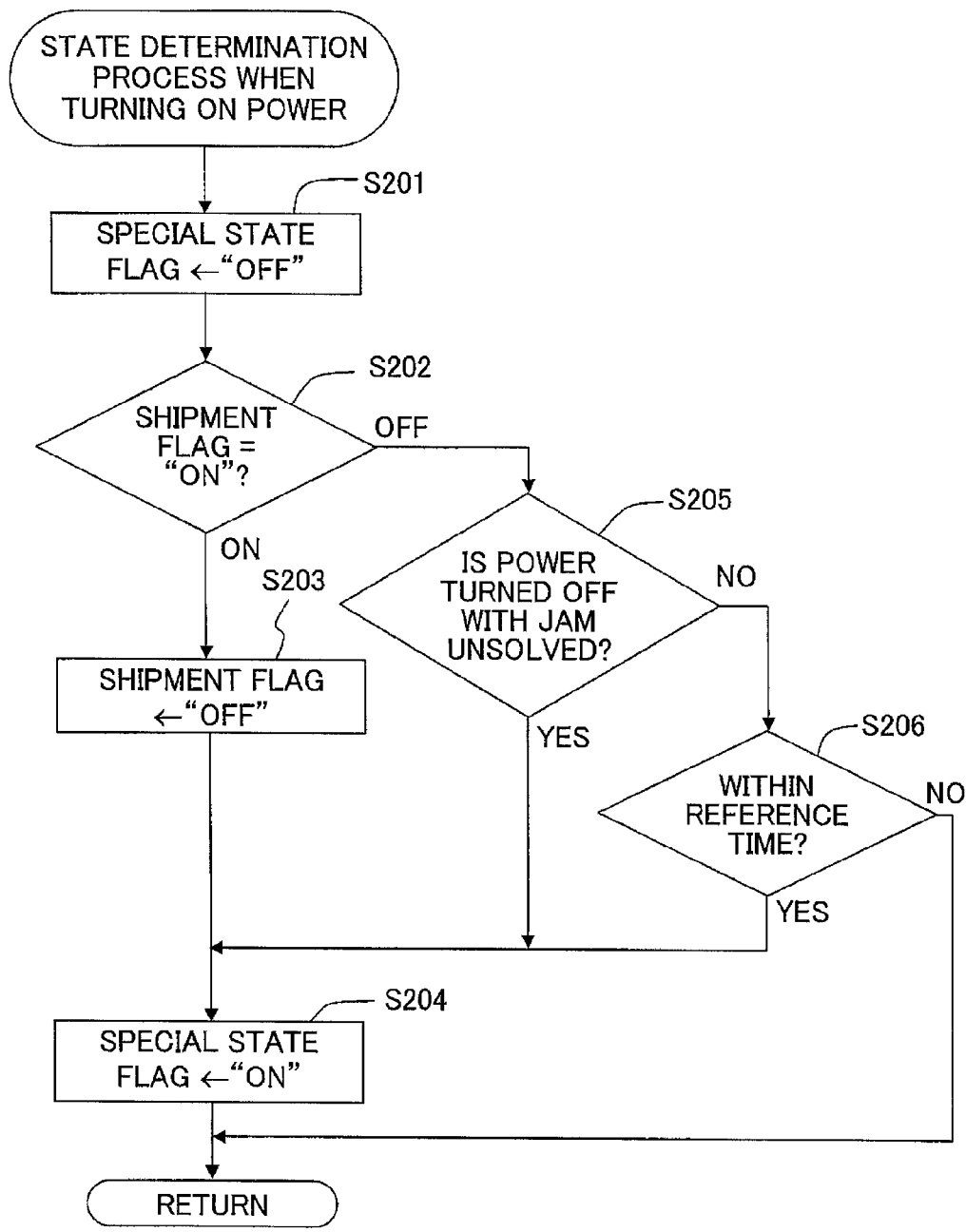
FIG. 3 is a flowchart showing a state determination process flow when turning on the power.

Next, referring to FIG. 3, an explanation will be given about the "state determination process when turning on the power" carried out in step S101.

In step S201, the CPU 10a sets the value "OFF" as the initial value to the special state flag to indicate that it is not the special state.

In step S202, the CPU 10a determines whether or not the aforementioned shipment flag is "ON", and proceeds to step S203 when it is "ON", but proceeds to step S205 when it is "OFF".

In step S203, the CPU 10a sets the value "OFF" to the shipment flag to indicate that electric power was supplied after factory shipment.

In step S204, the CPU 10a sets the value "ON" to the special state flag to indicate the special state. After carrying out step S204, the CPU 10a returns to the process of FIG. 2.

In step S205, the CPU 10a determines whether or not the power is turned off with some jam left unsolved. The CPU 10a is supposed to let the setting storage section 11 store the information indicating that some jam is occurring at the time of turning off the power with the jam left unsolved. Then, by referring to this information, the CPU 10a determines whether or not the power is turned off with the jam left unsolved. When the power is turned off with the jam left unsolved, then the CPU 10a proceeds to step S204, whereas when not, it proceeds to step S206. Because the CPU 10a proceeds to step S204 when the power is turned off with the jam left unsolved, the value "ON" is set to the special state flag to indicate the special state.

In step S206, the CPU 10a determines whether or not the elapsed time since the power was turned off is within the aforementioned reference time. Here, it is supposed that the detection section 17b measures the elapsed time since the power was turned off, and the CPU 10a refers to that time.

Figure 2:
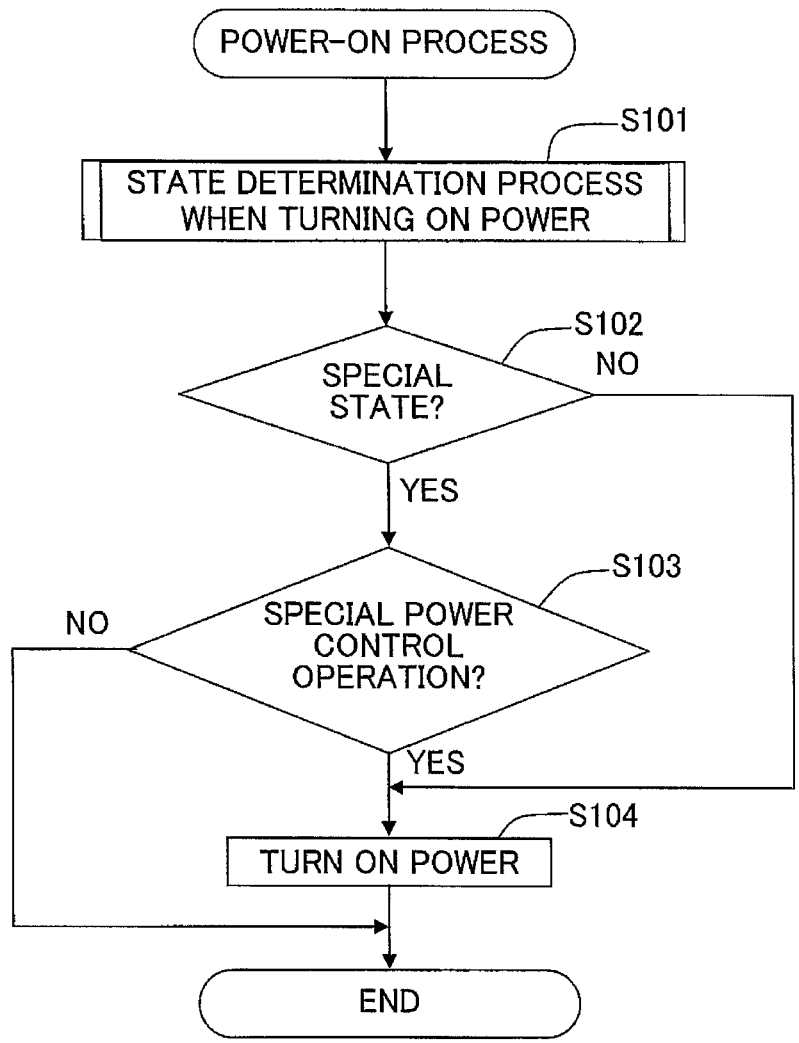
FIG. 2 is a flowchart showing a power-on process flow.

When the elapsed time is within the reference time, then the CPU 10a proceeds to step S204, whereas when it is beyond the reference time, then the CPU 10a ends this process and returns to the process of FIG. 2. Because the CPU 10a proceeds to step S204 when the elapsed time is within the reference time, the value "ON" is set to the special state flag to indicate the special state.

(4-2) Power-Off Process

Next, referring to FIG. 4, the power-off process will be explained. This process is started as the detection section 17b notifies the CPU 10a that a power control operation has begun when turning on the power to the multifunction printer 1.

The power-off process is substantively identical to the power-on process except that step S301 is carried out instead of step S101, and step S302 is carried out instead of step S104. Note that the same numbers are assigned here to the substantively identical steps to those of the power-on process, any explanation for which will be omitted.

In step S301, the CPU 10a carries out a "state determination process when turning off the power" to determine whether or not the state of the multifunction printer 1 is the special state.

In step S302, the CPU 10a controls the power source section 16 to carry out the operation of stopping the electric power supply to the every section except the detection section 17b. By virtue of this, the power to the multifunction printer 1 is turned off. Step S302 is another example of the power control process. Now, the detection section 17b starts to measure the elapsed time since the power was turned off.

Figure 5:
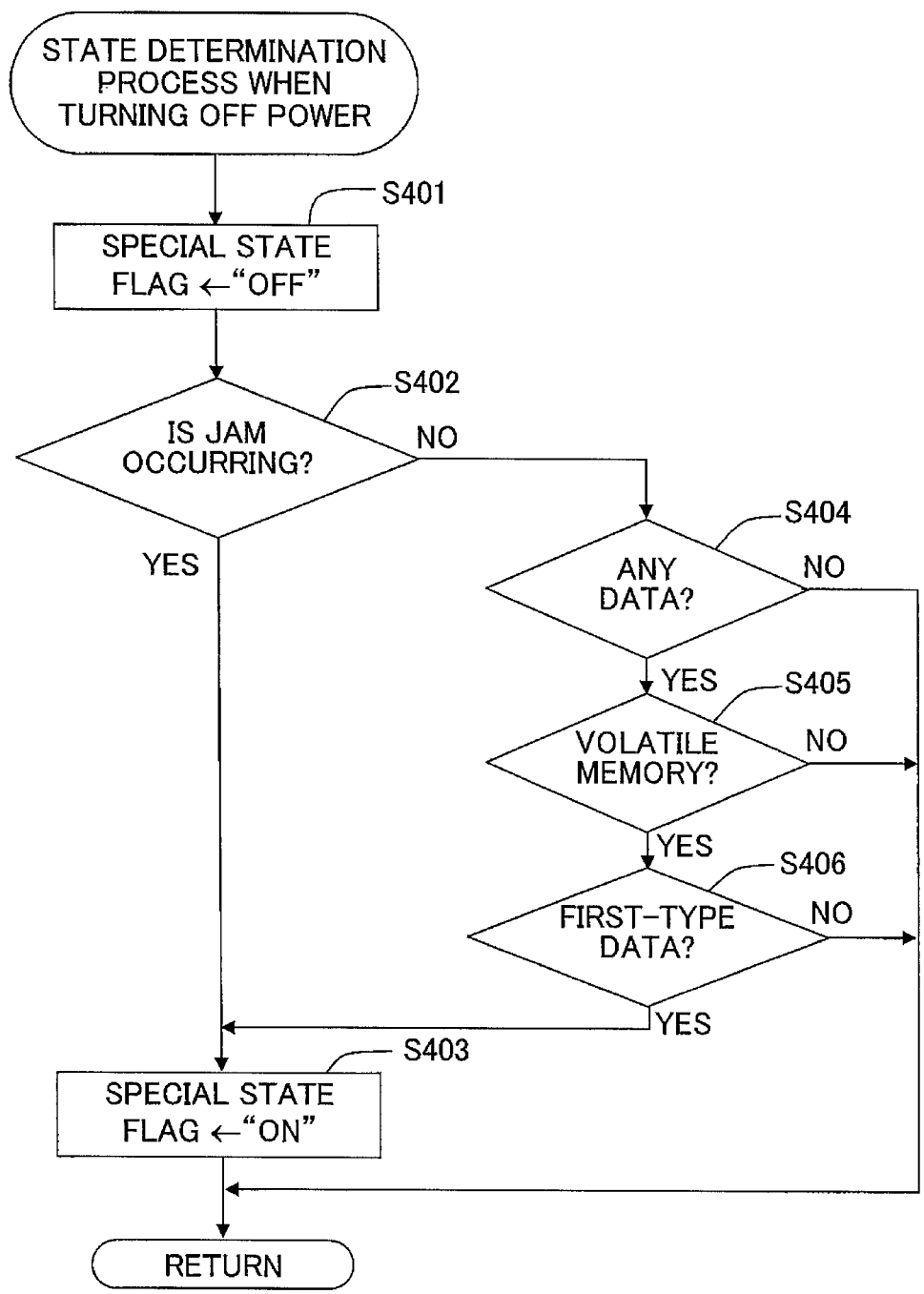
FIG. 5 is a flowchart showing a state determination process flow when turning off the power.

Next, referring to FIG. 5, an explanation will be given about the "state determination process when turning off the power" carried out in step S301.

In step S401, the CPU 10a sets the value "OFF" as the initial value to the special state flag to indicate that it is not the special state.

In step S402, the CPU 10a determines whether or not any jam is occurring, and proceeds to step S403 when some jam is occurring, but proceeds to step S404 when no jam is occurring.

In step S403, the CPU 10a sets the value "ON" to the special state flag to indicate the special state.

In step S404, the CPU 10a determines whether or not the RAM 10e has stored such data as the aforementioned print jobs waiting for printing, secure print jobs waiting for authentication, image data waiting for FAX-sending, information indicating the state of the multifunction printer 1, etc. When it has, then the CPU 10a proceeds to step S405, whereas when it has not, then the CPU 10a ends this process and returns to the process of FIG. 4.

In step S405, the CPU 10a determines whether the data are stored in the volatile memory RAM 10c or in a nonvolatile memory such as a flash memory, hard disk, or the like.

Because the model of the multifunction printer 1 determines whether the data are stored in a volatile memory or in a nonvolatile memory, the CPU 10*a* determines whether the data are stored in a volatile memory or in a nonvolatile memory by determining the model of the multifunction printer 1. When the data are stored in the volatile memory, then the CPU 10*a* proceeds to step S406, whereas when the data are stored in a nonvolatile memory, then it ends this process and returns to the process of FIG. 4.

Figure 4:
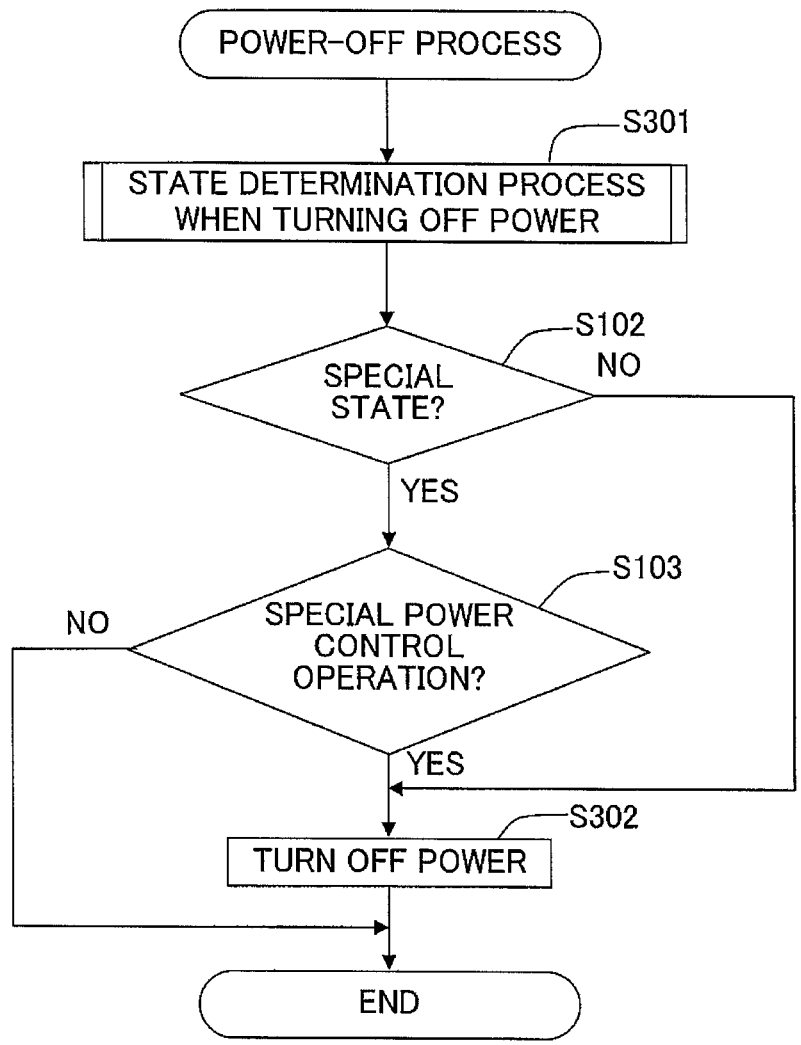
FIG. 4 is a flowchart showing a power-off process flow.

In step S406, the CPU 10*a* determines whether or not the first-type data are included in the data stored in the RAM 10*c*, and proceeds to step S403 when the first-type data are included, but ends this process and returns to the process of FIG. 4 when the first-type data are not included, i.e., only the second-type data are included. Because the CPU 10*a* proceeds to step S403 when the first-type data are included, the value "ON" is set to the special state flag to indicate the special state.

(5) Effects of the First Embodiment

According to the multifunction printer 1, when its state is not the special state, then it is possible to switch the electric power supply/stop whether the general power control operation or the special power control operation is carried out. In contrast to this, when it is the special state, then it is possible to switch the electric power supply/stop only through the special power control operation.

Therefore, when the user usually switches the electric power supply/stop through the general power control operation, then even when the user carries out the general power control operation without being aware of the special state, it is still not possible to switch the electric power supply/stop.

When it is not possible to switch the electric power supply/stop even though the general power control operation is carried out, then the user can become aware of the special state. In this case, the user can switch the electric power supply/stop either by carrying out the general power control operation after solving the cause of determining the special state, or by carrying out the special power control operation at will when the user desires to switch the electric power supply/stop with being aware of the special state.

Therefore, according to the multifunction printer 1, when the state of the image processing apparatus is the special state in which it is undesirable to switch the electric power supply/stop to the image processing section through the general power control operation, then it is possible for the user to switch the electric power supply/stop when the user desires to switch the electric power supply/stop with being aware of the special state, while restricting the user from switching the electric power supply/stop without being aware of the special state.

Further, according to the multifunction printer 1, when no electric power has ever been supplied to the image processing section since factory shipment, then even though the general power control operation is received, the electric power is still not supplied to the image processing section. Therefore, it is possible to reduce the risk of supplying the electric power to the image processing section without removing the protective sheet.

Further, according to the multifunction printer 1, it is possible to reduce the risk of falsely supplying the electric power to the image processing section due to the chattering.

Further, according to the multifunction printer 1, when the RAM 10*c* has stored the first-type data which bring a great influence when vanishing, then even though the general power control operation is received, the electric power is still not supplied to the image processing section. Therefore, it is possible to lessen the likelihood of vanishing of the data which bring a great influence when vanishing.

Further, according to the multifunction printer 1, when any jam is occurring, then even though the general power control operation is received, it is still not possible to switch the electric power supply/stop to the image processing section. Therefore, it is possible to reduce the risk of switching the electric power supply/stop with the occurring jam.

Further, according to the multifunction printer 1, because the special power control operation is more complicated than the general power control operation, when the state is the special state, it is possible to lessen the likelihood that the user may easily switch the electric power supply/stop without being aware of the special state. Further, the operation more complicated than the general power control operation may refer to any operation taking more time than the general power control operation, any operation pressing down the power key 17*a* a greater number of times than the general power control operation, or any operation involving a greater number of keys than the general power control operation.

Second Embodiment

Next, referring to FIG. 6, a second embodiment will be explained.

In the first embodiment, when the state of the multifunction printer 1 is not the special state, then the power source section 16 is caused to carry out the operation of supplying the electric power or the operation of stopping the electric power supply whether the general power control operation or the special power control operation is carried out. In contrast to this, in the second embodiment, even when the state of the multifunction printer 1 is not the special state, the power source section 16 is not caused to carry out the relevant operation when the general power control operation is not carried out.

Figure 6:
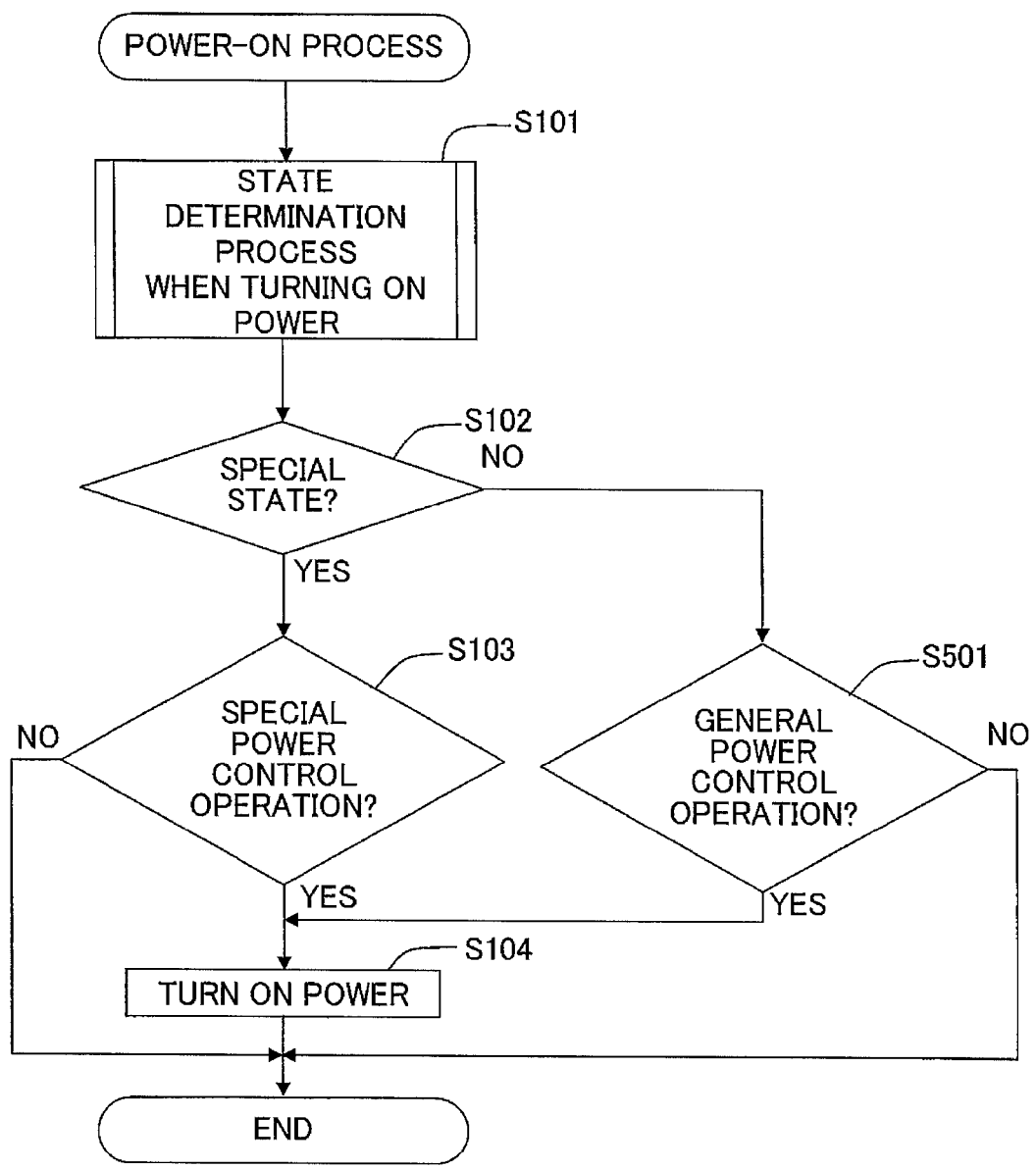
FIG. 6 is a flowchart showing a power-on process flow in accordance with a second embodiment.

Referring to FIG. 6, an explanation will be given about a power-on process according to the second embodiment. Note that the same numbers are assigned to the substantively identical steps to those in the first embodiment, any explanation for which will be omitted.

When it is determined to be not the special state in step S102, then the CPU 10*a* determines whether or not the power control operation, of which the detection section 17*b* has notified the CPU 10*a*, is the general power control operation in step S501. Then, the CPU 10*a* proceeds to step S104 when it is the general power control operation, but ends this process when it is not the general power control operation. Step S501 is an example of a general operation determination process.

Because the CPU 10*a* proceeds to step S104 when it is determined to be the general power control operation in step S501, the power to the multifunction printer 1 is turned on. In contrast to this, because the CPU 10*a* ends this process when it is determined to be not the general power control operation but the special power control operation, the power to the multifunction printer 1 is not turned on.

Based on the multifunction printer 1 according to the second embodiment explained above, when the state of the multifunction printer 1 is not the special state, then only the general power control operation is receivable. In this manner, because every user can distinguish the power control operation when it is not the special state from the power control operation when it is the special state, it is possible to more reliably reduce the risk of switching the electric power supply/stop without being aware of the special state.

Further, although the explanation made here takes an example of the power-on process, the same is true for the power-off process.

Other Embodiments

Without being limited to the embodiments explained by way of the above descriptions and figures, embodiments as follows, for example, are also included in the technical scope of the present teaching.

(1) In the above embodiments, in both cases of turning on and turning off the power to the multifunction printer 1, it is determined whether or not its state is the special state. However, it is also possible to determine the state only in one case, while turning on or off the power without determining whether or not it is the special state in the other case.

(2) The explanations made in the above embodiments take an example that the detection section 17b notifies the CPU 10a that a power control operation has begun, and which power control operation is carried out, separately. In contrast to this, the detection section 17b may alternatively not notify the CPU 10a that a power control operation has begun, but notify it of the power control operation after the user finishes that power control operation.

In other words, when a power control operation has begun, the CPU 10a may either start the state determination process without waiting until the power control operation is finished, or wait to start the state determination process until the power control operation is finished.

(3) The explanations made in the above embodiments take an example that the special power control operation is the "long press". However, the special power control operation is not limited to the "long press", but may be any operation different from the general power control operation. For example, the special power control operation may also be such an operation as pressing down the power key 17a intermittently in a specific pattern.

Further, the power source operation section 17 is not limited to being constituted by the one power key 17a, but may also be constituted by, for example, two operation keys. Then, the general power control operation may be such an operation as short-pressing any one of the two operation keys, while the special power control operation may be such an operation as pressing the both operation keys simultaneously.

(4) The explanations made in the above embodiments take an example that the special power control operation is more complicated than the general power control operation. However, in so far as the general power control operation is at least different from the special power control operation, the general power control operation may inversely be more complicated than the special power control operation.

(5) The explanations made in the above embodiments take an example that even though the second-type data are stored in the RAM 10c, when the first-type data are not stored, then it is still determined to be not the special state. In contrast to this, when some data are stored in the RAM 10c, then it may be determined to be the special state regardless of the type of the data.

(6) The explanations made in the above embodiments take an example of regarding an occurrence of jam as an occurrence of abnormity in the image processing section. However, depending on the abnormity occurring, the occurrence of abnormity in the image processing section may be attributed to other events when it is undesirable to switch the electric power supply/stop. For example, it may be attributed to such an event that some problem is occurring in any component constituting the image processing section.

(7) The explanation made in the first embodiment takes an example of first determining whether or not the state is the special state, and then determining whether or not the operation is the special power control operation. However, the sequence of determinations is not limited to this, but can be decided appropriately. For example, it is also possible to first determine whether or not the operation is the special power control operation, and then determine whether or not the state is the special state. The same is true for the second embodiment.

(8) The explanations made in the above embodiments take an example that the control section 10 includes the one CPU 10a. In contrast to this, the control section 10 may also be constituted by a plurality of CPUs, or by an ASIC, or by combination of at least one CPU with at least one ASIC.

According to the above image processing apparatus, when its state is not the special state, then whether the general power control operation or the special power control operation is carried out, it is possible to switch the electric power supply/stop. In contrast to this, when it is the special state, then it is only possible to switch the electric power supply/stop merely through the special power control operation.

Therefore, when a user usually switches the electric power supply/stop through the general power control operation, then even carrying out the general power control operation without being aware of the special state, the user still cannot switch the electric power supply/stop.

When it is not possible to switch the electric power supply/stop by carrying out the general power control operation, then the user can become aware of the special state. In this case, the user can switch the electric power supply/stop by carrying out the special power control operation when the user desires to switch the electric power supply/stop with knowledge of the special state.

Thus, according to the above image processing apparatus, it is possible for the user to switch the electric power supply/stop when the user desires to switch the electric power supply/stop with being aware of the special state while restricting the user from switching the electric power supply/stop without being aware of the fact that the state of the image processing apparatus is the special state such that it is undesirable to switch the electric power supply/stop to the image processing section through the general power control operation.

Further, the technique disclosed in the present description can be realized by various aspects such as an image processing system, an image processing method, an image processing program, a recording medium having recorded the image processing program, etc.

What is claimed is:

1. An image processing apparatus comprising:
   an image processing section;
   a power source section configured to supply electric power to the image processing section;
   a power source operation section configured to receive power control operation which includes a general power control operation and a special power control operation different from the general power control operation; and
   a controller configured to perform:
      determining whether or not a state of the image processing apparatus is a special state where the switching of the electric power supply/stop to the image processing section according to the general power control operation is restricted, under a condition that the power control operation is started;
      determining whether or not a power control operation received by the power source operation section is the special power control operation;

controlling the power source section to carry out an operation including supplying the electric power to the image processing section, under a condition that the state of the image processing apparatus is determined to be not the special state, controlling the power source section to carry out the operation including supplying the electric power to the image processing section, under a condition that the state of the image processing apparatus is determined to be the special state and that the power control operation is determined to be the special power control operation; and controlling the power source section not to carry out the operation, under a condition that the state of the image processing apparatus is determined to be the special state and that the power control operation is determined to be not the special power control operation, wherein the operation includes supplying the electric power to the image processing section, and the special state is such that an elapsed time since stopping the electric power supply to the image processing section is within a reference time.

2. The image processing apparatus according to claim 1, wherein the controller is further configured to perform:

determining whether or not the power control operation received by the power source operation section is the general power control operation; and controlling the power source section not to carry out the operation even though the state of the image processing apparatus is determined to be not the special state, under a condition that the power control operation is determined to be not the general power control operation.

3. The image processing apparatus according to claim 1, further comprising a nonvolatile memory configured to store electric power supply information indicating whether or not electric power has ever been supplied to the image processing section, wherein at the time of shipping the image processing apparatus from the factory, the nonvolatile memory stores the electric power supply information indicating that no electric power has ever been supplied to the image processing section and the control section is further configured to perform:

determining the state to be the special state under a condition that the nonvolatile memory stores the electric power supply information indicating that no electric power has ever been supplied to the image processing section;

controlling the power source section to supply the electric power to the image processing section under a condition that the state of the image processing apparatus is determined to be the special state and that the power control operation is determined to be the special power control operation; and rewriting the electric power supply information indicating that the electric power was supplied to the image processing section after factory shipment.

4. The image processing apparatus according to claim 1, wherein the special state is a state in which some abnormity is occurring in the image processing section.

5. The image processing apparatus according to claim 1, wherein the special power control operation is more complicated than the general power control operation.

6. The image processing apparatus according to claim 1, wherein the special state includes a state in which the power to the image processing apparatus is turned on for the first time after shipment.

* * * * *